United States Patent [19]
Hessel et al.

[11] Patent Number: 5,181,746
[45] Date of Patent: Jan. 26, 1993

[54] SEALING SLEEVE AND ITS USE

[75] Inventors: Joachim Hessel, Egelsbach; Rolf Koch, Eltville; Wolfgang Sturm, Glashütten, all of Fed. Rep. of Germany

[73] Assignee: Hoechst Aktiengesellschaft, Fed. Rep. of Germany

[21] Appl. No.: 701,479

[22] Filed: May 16, 1991

[30] Foreign Application Priority Data

May 18, 1990 [DE] Fed. Rep. of Germany ....... 4016062

[51] Int. Cl.⁵ .............................................. F16L 35/00
[52] U.S. Cl. ......................................... 285/3; 285/15; 285/55; 285/162; 29/450
[58] Field of Search ............... 285/59, 60, 64, 332, 285/334.2, 339, 162, 158, 334.4, 3, 15, 55; 29/450

[56] References Cited

U.S. PATENT DOCUMENTS 1,676,585 10/1925 Tiefenbacher ...................... 285/339
2,998,269 10/1958 Houghton ....................... 285/339 X
4,323,166 4/1982 Maeroff ........................... 285/162 X

FOREIGN PATENT DOCUMENTS 3836537 5/1990 Fed. Rep. of Germany .

*Primary Examiner*—Dave W. Arola
*Attorney, Agent, or Firm*—Connolly and Hutz

[57] ABSTRACT

A method which is easy to carry out for connecting domestic drainage conduits to collector sewers uses a special sealing sleeve, comprising a tubular, externally cylindrical body, the one side of which is closed by a thin elastic diaphragm, and on the other side of which, opposite the diaphragm, an outwardly projecting bead is mounted, and the inside wall of which forms essentially two stepped cones, the wall thickness increasing toward the diaphragm. The domestic drainage pipe, together with the sealing sleeve, is inserted in the collector sewer from the outside. The sealing sleeve allows a repair of defective domestic drainage conduits without extensive earth works.

3 Claims, 5 Drawing Sheets

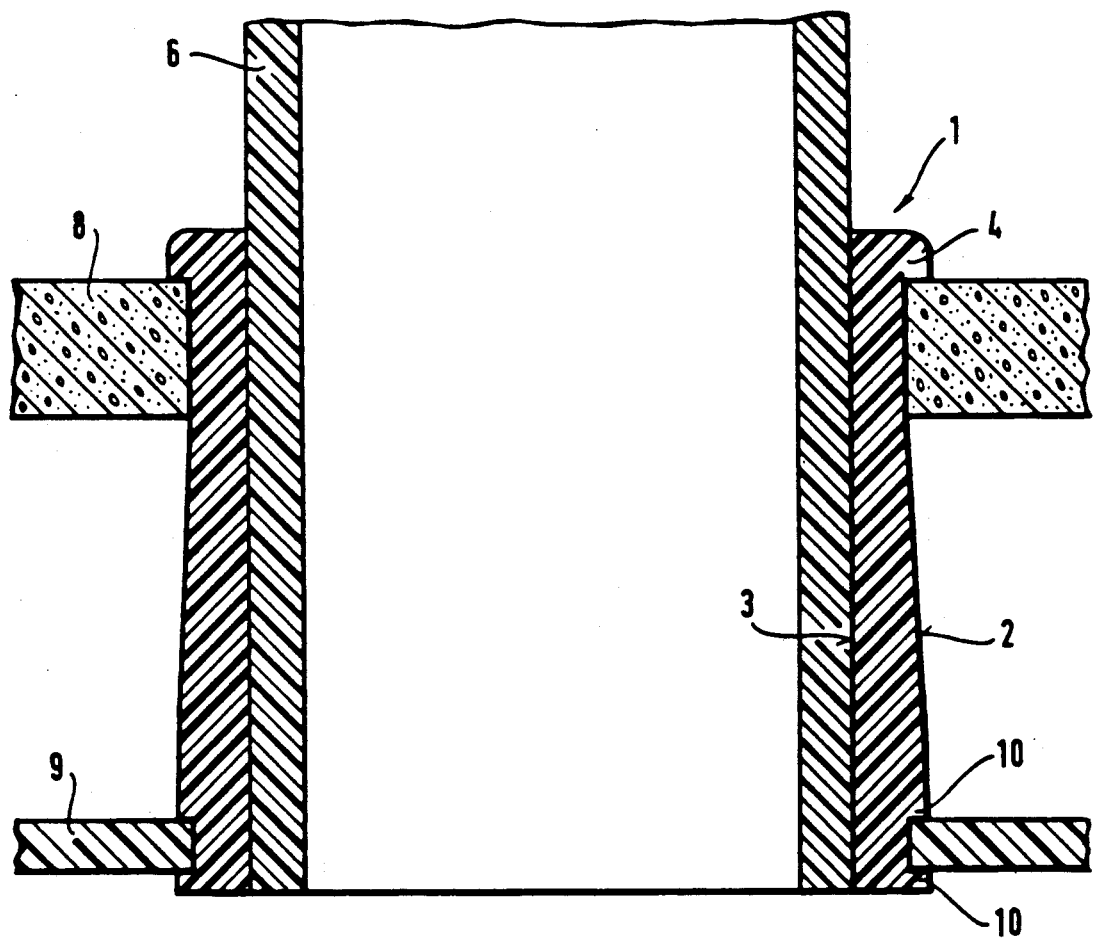

SEALING SLEEVE AND ITS USE

BACKGROUND OF THE INVENTION

The invention relates to a sealing sleeve and its use in the connection of domestic drainage conduits to the public sewerage system.

Domestic drainage conduits are customarily installed in such a way that firstly a ditch is dug from the house to the collector and the pipes are laid at the bottom of the ditch. The connection to the collector takes place by means of prefabricated branch pipes in the collector.

If a collector is to be renewed by insertion of a plastic pipe (relining), this method can only be applied with restrictions because, on the one hand, extensive earth works have to be spared and, on the other hand, the sealing of the orifice of the domestic drainage conduit into the collector is difficult.

The object was to find a connection method which is easy to carry out and brings about a reliable seal.

An older solution proposal relates to a method for connecting domestic drainage conduits to collector sewers and uses a special sealing sleeve comprising a tubular, externally cylindrical body, the one side of which is closed by a thin elastic diaphragm, and on the other side of which, opposite the diaphragm, an outwardly projecting bead is mounted, and the inside wall of which is cylindrical over a length of two thirds, measured from the bead side, of the overall length of the sleeve and then forms a cone (which corresponds to a third of the overall length), the wall thickness increasing toward the diaphragm (cf. German Patent No. 3,836,537). The domestic drainage pipe, together with the sealing sleeve, is inserted in the collector sewer from the outside. The sealing sleeve allows repair of defective domestic drainage conduits without extensive earth works.

This method is not completely satisfactory because only thick-wall pipes can be sealed reliably with the one-third cone.

SUMMARY OF THE INVENTION

It was found that the object can be achieved if a sealing sleeve with a stepped conical inside wall is used.

The invention consequently relates to a sealing sleeve, comprising a tubular, externally cylindrical body, the one side of which is closed by a thin elastic diaphragm, and on the other side of which, opposite the diaphragm, an outwardly projecting bead is mounted, and the inside wall of which forms essentially two stepped cones, the wall thickness increasing toward the diaphragm, and a method for its use.

The sleeve according to the invention is a tubular, externally cylindrical body, in which the one side is closed by a thin elastic diaphragm. On the side opposite the diaphragm, the edge is provided with an outwardly projecting bead. The inner wall is of stepped conical construction. The wall thickness increases from the bead side toward the closed side.

The size of the sealing sleeve is oriented by the diameters of the pipes to be connected. In this case, the inside diameter of the sealing sleeve is dependent on the diameter of the domestic drainage conduit and the length of the sleeve is dependent on the diameter—and the wall thickness predetermined thereby—of the collector. For example, if there is a plastic relining pipe in a stoneware collector, the sealing sleeve is particularly long. The wall thickness of the sleeve at the bead side is 9 to 10% of the inside diameter and increases toward the closed end by 11 to 15%. The height and the width of the bead are 5 to 15%, relative to the inside diameter. The closure diaphragm is 0.2 to 1.0 mm thick, depending on the material of which the sleeve is composed.

The length of the cone situated at the closed end is about 20 to 30% of the overall diameter of the sleeve, the length of the other cone is about 40 to 60% of the overall diameter of the sleeve.

The sealing sleeve according to the invention is composed of a rubber elastic material, for example polychloroprene.

A preferred sealing sleeve for a domestic drainage conduit composed of a 180 mm thick pipe made of polyethylene has the following dimensions:

| | |
|---|---|
| Inside diameter at the bead side | 180 mm |
| Inside diameter at the closed side | 170 mm |
| Wall thickness | 16 or 21 mm |
| Height of the bead | 15 mm |
| Width of the bead | 6 mm |
| Overall length | 200 mm |
| Thickness of the closure diaphragm | 0.5 mm |

The sealing sleeve is intended for pipes made of conventional materials, in which a relining pipe is located.

The method for applying the sealing sleeve according to the invention is carried out in such a way that the domestic drainage pipe is sloped on the outside at the end facing the collector to form a cone, the length and the angle of the cone complying with the corresponding dimensions in the sleeve. Then the pipe end is inserted in the sealing sleeve up to the beginning of the first cone. A ditch is then dug at a suitable place and a precisely targeted bore hole is driven toward the collector—if the collector does not allow access by man—or from the collector toward the house—if the collector does allow access by man. The diameter of this bore hole in the ground corresponds at least to the overall diameter of the sealing sleeve, but in the wall of the collector it corresponds to the diameter of the cylindrical part of the sleeve. The domestic drainage pipe is now pushed from the house through the bore hole with the sleeve at the front until the sleeve rests with the bead on the outside of the wall of the collector. When the pipe is pushed further, the conical surfaces of the sleeve are forced on and pressed firmly against the wall of the bore hole in the wall of the collector and the closure diaphragm is perforated. The sleeve material forms a circumferential sealing bead. The conical pipe end protruding into the collector is cut off at an adequate distance from the inside wall of the sewer—by means of a cutting robot if the sewer does not allow access by man.

BRIEF DESCRIPTION OF THE DRAWING

The figures show a sealing sleeve according to the invention (FIG. 1) and the operations in its application (FIGS. 2, 3, 4 and 5).

DETAILED DESCRIPTION OF THE INVENTION

Figure 1:
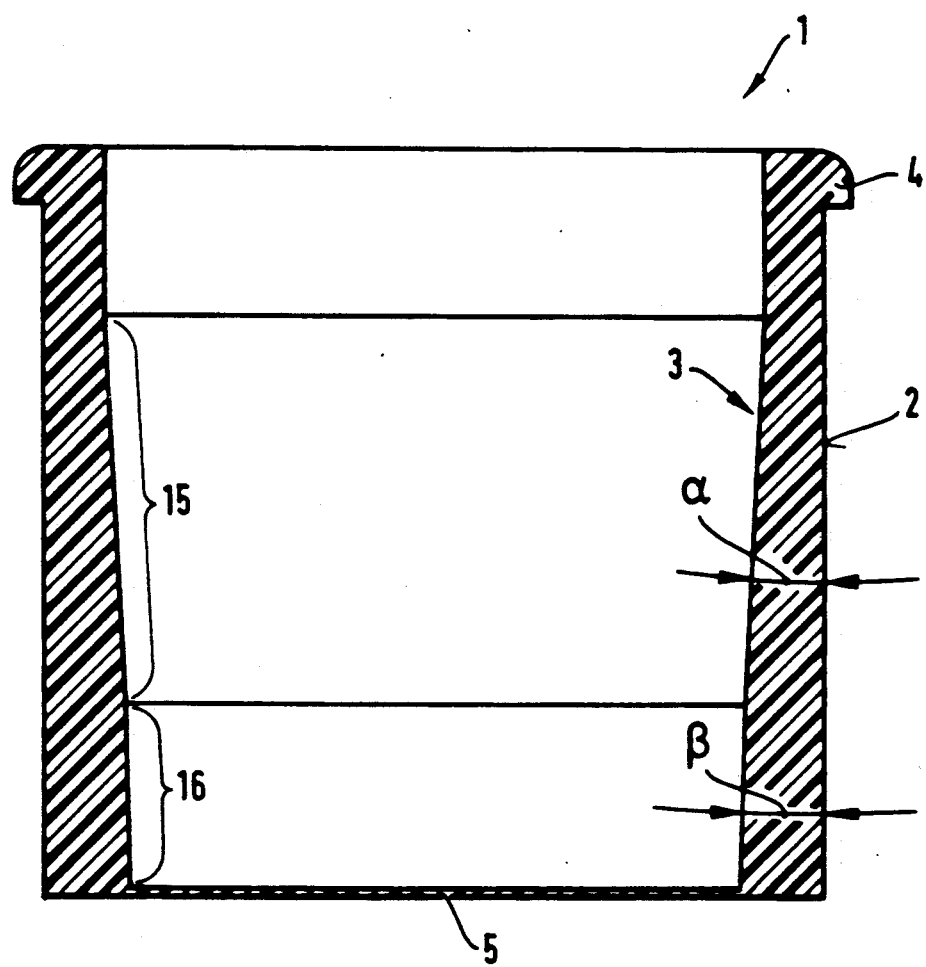

The sleeve (1) according to FIG. 1 has a smooth cylindrical outside wall (2) and a conical inside wall (3). At the upper edge, the sleeve (1) terminates in a bead (4), whereas it is closed at the bottom by a closure diaphragm (5).

Figure 2:
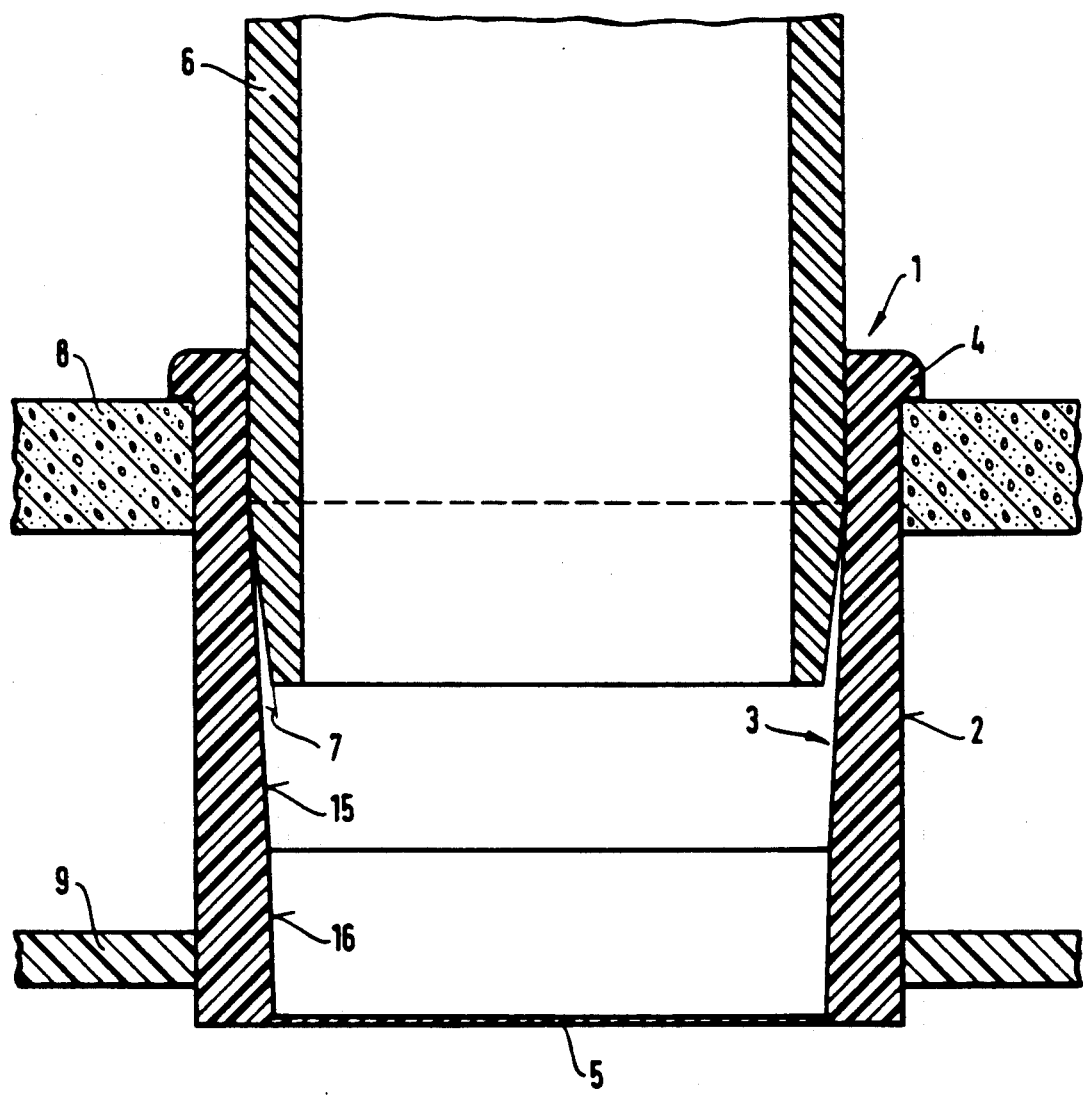

FIGS. 2, 3, 4 and 5 show the connection of a domestic drainage conduit to a repaired collector sewer, i.e. a collector sewer containing an inserted plastic pipe. In FIG. 2, the domestic drainage pipe (6), which is provided at its front end with a cone (7), has been pushed into the sleeve (1) up to the beginning of the first cone (15). The domestic drainage pipe (6) and the sleeve (1) have been guided through the collector pipe (8) and the plastic pipe (reliner) (9) until the bead (4) was resting firmly on the collector pipe (8).

Figure 3:
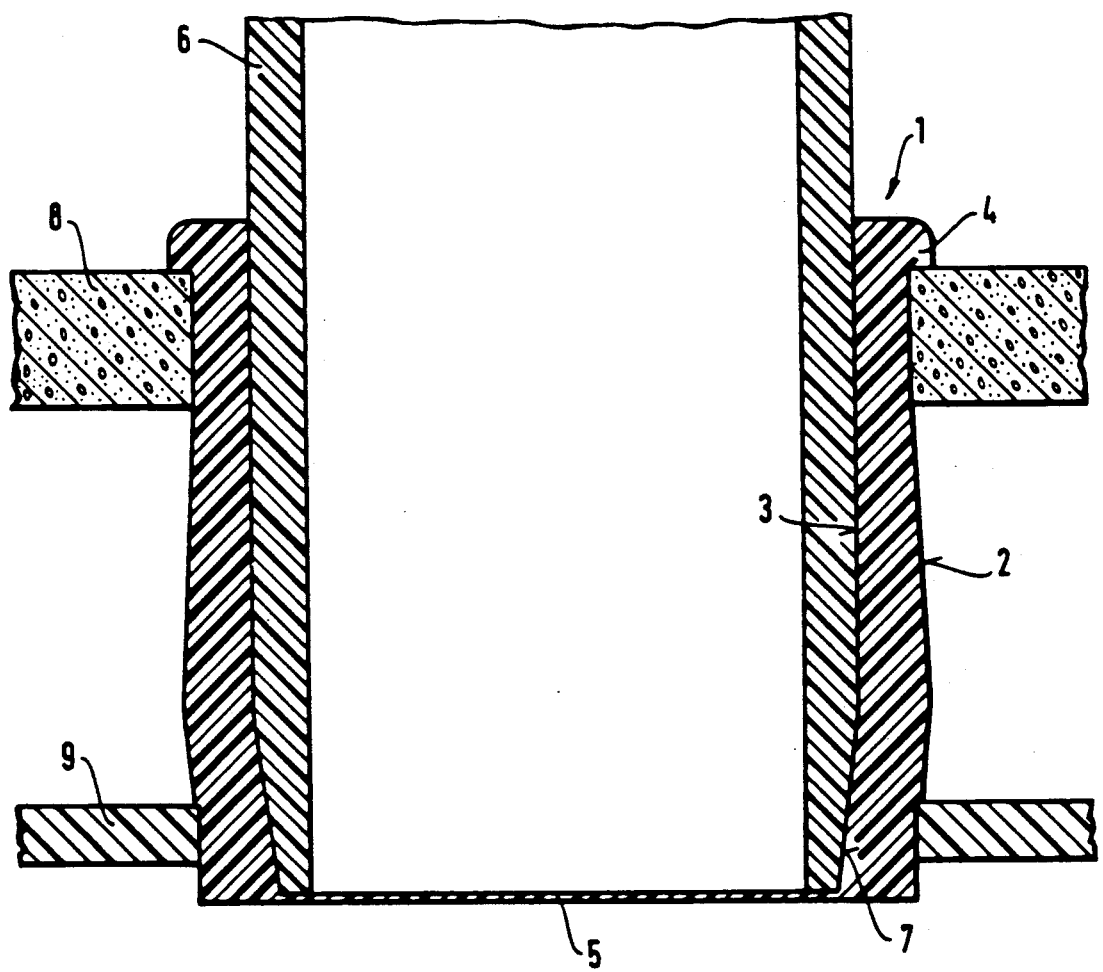

FIG. 3 shows the state at that moment at which the domestic drainage pipe (6), when it is being pushed in, has reached the second cone (16). In this process, it was brought about that an expansion in the shape took place in the region of the first cone (15) and a frictional connection was produced between the plastic pipe (9) and the sleeve (1).

Figure 4:
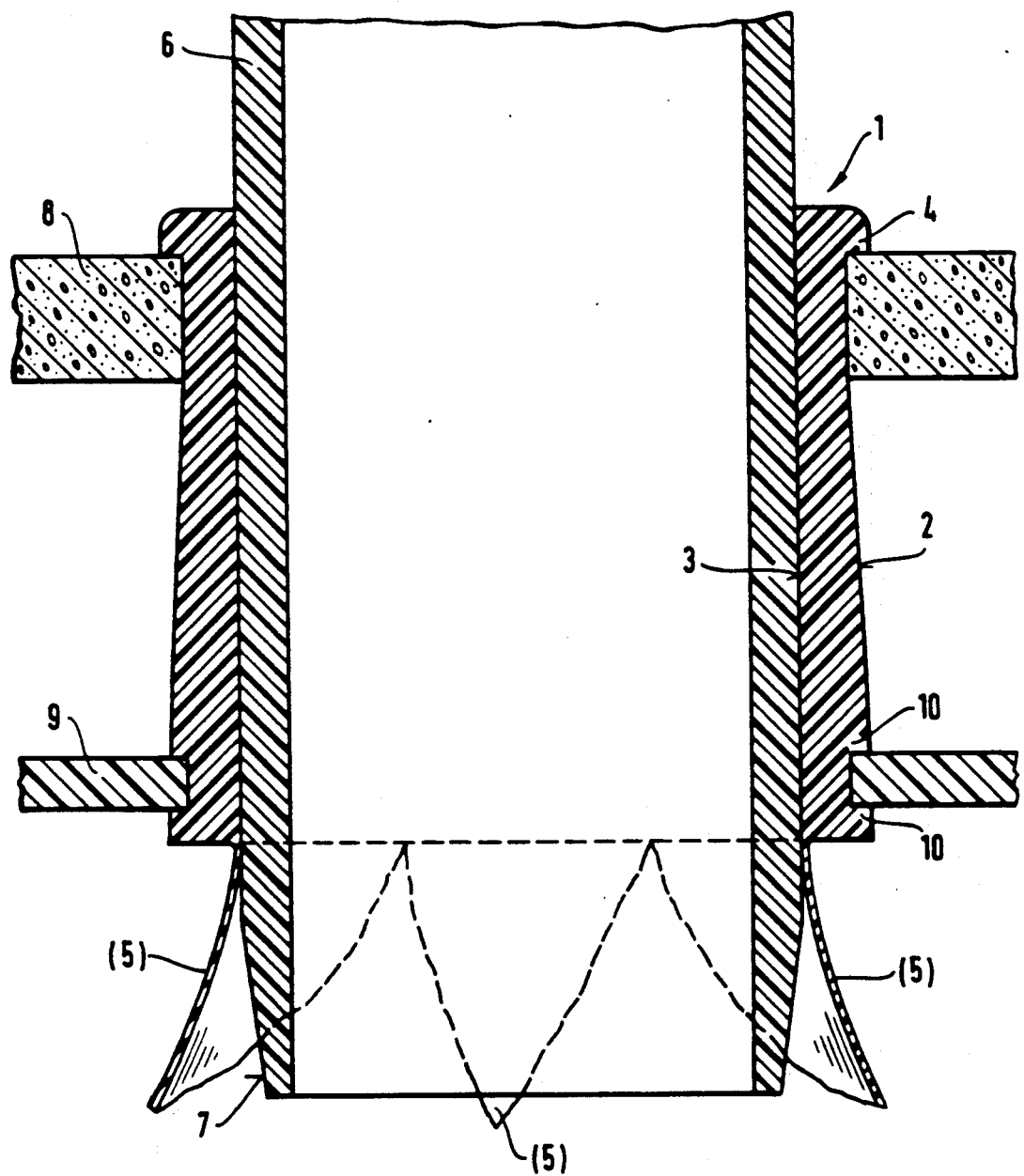

In FIG. 4, the domestic drainage pipe (6) has been pushed through the second cone (16) of the sleeve thus forming the bead (10). The overhanging ends of the pipe (6) and the sleeve (1) were cut off, as is shown in FIG. 5. Since greater forces have to be applied in the pushing-in direction to form the bead, the pitch ($\beta$) of the second cone (16) is expediently smaller at about 1:50 than the pitch ($\alpha$) of the cone (15) at about 1:25.

The sealing sleeve according to the invention brings about a seal which is resistant to moisture and chemicals between the domestic drainage pipe and the collector sewer pipe. The connection is slightly elastic and can therefore absorb any slight settling and displacement movements. The application of the sleeve is easy, with the result that reliable installation results are to be expected. In this case, the closure diaphragm provides the advantages that it can serve as a stop for the domestic drainage conduit and, moreover, no dirt can pass into the domestic drainage conduit during the assembly. The sealing sleeve according to the invention allows a repair of defective domestic drainage conduits without extensive open earth works.

I claim:

1. A method for connecting a domestic drainage conduit to a collector sewer, wherein a drainage pipe to be connected is sloped on the outside at the end facing the collector sewer to form a cone, the drainage pipe is inserted in a sealing sleeve, which comprises a tubular, externally cylindrical body, the one side of which is closed by a thin elastic diaphragm, and on the other side of which, opposite the diaphragm, a radially outwardly projecting bead is mounted, and the inside wall forms essentially two stepped cones, the wall thickness continuously increasing throughout the extent of said cones toward and up to the diaphragm, the pipe with the sealing sleeve is pushed into the sewer through a bore hole in the wall of the collector sewer until the cone of the pipe has passed through the sleeve diaphragm and the ends of the pipe and the sleeve diaphragm protruding into the collector sewer are cut off at an adequate distance from the inside wall of the sewer.

2. A sealing sleeve comprising a tubular, externally cylindrical body having upper and lower ends, an elastic diaphragm extending across and closing the lower end of the body, a bead at the upper end of the body outwardly extending in a radial direction, the body having an inside wall forming two stepped cone surfaces and a wall thickness that continuously increases throughout the extent of the cone surfaces toward and up to the diaphragm.

3. A sealing sleeve as in claim 2 wherein the cone surface closest to the diaphragm has a pitch smaller than the pitch of the other cone surface.

* * * * *